(12) United States Patent
Uchide

(10) Patent No.: US 10,571,293 B2
(45) Date of Patent: Feb. 25, 2020

(54) SPEECH GUIDANCE DEVICE AND SPEECH GUIDANCE METHOD

(71) Applicant: MITSUBISHI ELECTRIC CORPORATION, Tokyo (JP)

(72) Inventor: Hayato Uchide, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 104 days.

(21) Appl. No.: 15/779,294

(22) PCT Filed: Mar. 29, 2016

(86) PCT No.: PCT/JP2016/060026
§ 371 (c)(1),
(2) Date: May 25, 2018

(87) PCT Pub. No.: WO2017/168543
PCT Pub. Date: Oct. 5, 2017

(65) Prior Publication Data
US 2018/0356246 A1    Dec. 13, 2018

(51) Int. Cl.
*G01C 21/36* (2006.01)
*G06F 3/01* (2006.01)
(Continued)

(52) U.S. Cl.
CPC .......... *G01C 21/3629* (2013.01); *B60K 35/00* (2013.01); *G01C 21/3658* (2013.01);
(Continued)

(58) Field of Classification Search
CPC ............ G01C 21/3629; G01C 21/3658; B60K 35/00; B60K 2370/166; B60K 2370/21;
(Continued)

(56) References Cited

U.S. PATENT DOCUMENTS 5,729,109 A * 3/1998 Kaneko ............... G01C 21/3629
318/582
6,078,865 A * 6/2000 Koyanagi .......... G01C 21/3644
701/438

(Continued)

FOREIGN PATENT DOCUMENTS

JP          7-12581 A    1/1995
JP       2004-37151 A    2/2004
(Continued)

OTHER PUBLICATIONS

International Search Report for PCT/JP2016/060026 (PCT/ISA/210) dated Jun. 21, 2016.

*Primary Examiner* — Michael J Zanelli
(74) *Attorney, Agent, or Firm* — Birch, Stewart, Kolasch & Birch, LLP

(57) ABSTRACT

A speech guidance device includes; a guidance object determining unit for outputting a guidance object to which a visual line of a user is guided; a visual recognition object detecting unit for detecting a visual recognition object which the user is viewing from information indicating a direction of the visual line of the user; a difference detecting unit for detecting a difference between an attribute of the visual recognition object and an attribute of the guidance object; a generating unit for generating a guidance sentence including the attribute of the guidance object; and a synthesizing unit for, when there is a difference between the attribute of the guidance object included in the guidance sentence and the attribute of the visual recognition object, synthesizing and outputting speech of the guidance sentence emphasizing a word of the attribute having the difference.

6 Claims, 12 Drawing Sheets

(51) Int. Cl.
  *B60K 35/00*     (2006.01)
  *G06T 7/70*      (2017.01)
  *G06F 3/16*      (2006.01)

(52) U.S. Cl.
  CPC .............. *G06F 3/013* (2013.01); *G06F 3/167* (2013.01); *G06T 7/70* (2017.01); *B60K 2370/166* (2019.05); *B60K 2370/194* (2019.05); *B60K 2370/21* (2019.05)

(58) Field of Classification Search
  CPC ... B60K 2370/194; G06F 3/013; G06F 3/167; G06T 7/70
  See application file for complete search history.

(56) References Cited

U.S. PATENT DOCUMENTS

| | | | | |
|---|---|---|---|---|
| 8,958,982 | B2 * | 2/2015 | Sempuku | G01C 21/3644 340/995.18 |
| 2012/0136505 | A1 * | 5/2012 | Mori | G01C 21/3602 701/1 |
| 2014/0156181 | A1 * | 6/2014 | Watanabe | G01C 21/3632 701/427 |
| 2016/0231135 | A1 | 8/2016 | Nishibashi et al. | |

FOREIGN PATENT DOCUMENTS

| | | |
|---|---|---|
| JP | 2007-155392 A | 6/2007 |
| JP | 2011-174723 A | 9/2011 |
| JP | 5393546 B2 | 1/2014 |
| WO | WO 2015/059812 A1 | 4/2015 |

\* cited by examiner

| Name of Intersection | Shape of Road | Name of Surrounding Building | Position |
|---|---|---|---|
| Intersection A | Three-Way Junction of Y-Letter Shape | Fire Station | Longitude x1, Latitude y1 |
| Intersection B | Three-Way Junction | Gas Station | Longitude x2, Latitude y2 |
| Intersection C | Three-Way Junction of Y-Letter Shape | Convenience Store | Longitude x3, Latitude y3 |

| Name of Intersection | Shape of Road | Name of Surrounding Building | Position | Distance | Direction |
|---|---|---|---|---|---|
| Intersection A | Three-Way Junction of Y-Letter Shape | Fire Station | Longitude x1, Latitude y1 | 200 m Ahead | Right Direction |

32

41

Turn Right At [Name of Intersection]
With [Name of Surrounding Building], in [Direction], [Distance].

| Name of Intersection | Intersection B |
|---|---|
| Shape of Road | Crossroads |
| Name of Surrounding Building | Fire Station |
| Position | Longitude x1, Latitude y1 |
| Distance | 100 m Ahead |
| Direction | Right Direction |

| Name of Intersection | Intersection A |
|---|---|
| Shape of Road | Crossroads |
| Name of Surrounding Building | Police Station |
| Position | Longitude x2, Latitude y2 |
| Distance | 50 m Ahead |
| Direction | Right Direction |

| Name of Intersection |
|---|
| Name of Surrounding Building |
| Position |
| Distance |

Turn Right at <Intersection B> With a <Fire Station> in [Right Direction], <100 m Ahead>.

[ ]: Portion To Be Filled in (Without Emphasis)
< >: Portion To Be Filled in (With Emphasis)

| Name of Switch | Switch 52b |
|---|---|
| Position | Second Uppermost in Upper Left Side |
| Operation | ON |
| Color | White |

| Name of Switch | Switch 52i |
|---|---|
| Position | Uppermost in Lower Side |
| Operation | ON |
| Color | White |

Turn [On] <Switch 52i> That Is <Uppermost in Lower Side>.

[   ]: Portion To Be Filled in (Without Emphasis)
<   >: Portion To Be Filled in (With Emphasis)

SPEECH GUIDANCE DEVICE AND SPEECH GUIDANCE METHOD

TECHNICAL FIELD

The present invention relates to a speech guidance device for providing information to a user by speech.

BACKGROUND ART

In recent years, route guidance devices for vehicles have been widely used. Route guidance devices are also called navigation devices. When a destination is input from a user, a route guidance device sets an optimum route from the current position to the destination and provides guidance along the set optimum route to guide the user to the destination. In addition, an external information center can distribute map information and related information to the route guidance device via the Internet. Therefore, the route guidance device can provide route guidance using the latest map information and related information.

Disclosed is a route guidance device including a visual recognition guidance device for detecting a visual line direction of a driver and an object of gaze using an eye camera attached in front of a driver's seat of a vehicle, judging whether the driver's visual line direction and the object of gaze are correct with respect to a route, and, in a case where it is correct, performing positive speech guidance and, in a case where it is incorrect, guiding the visual line of the driver. In a case where the driver's visual line direction and the object of gaze are incorrect with respect to the route, the visual recognition guidance device performs speech guidance to guide the driver's visual line to a branching road to be guided, by using an object that the driver is viewing as a reference (see Patent Literature 1 below).

CITATION LIST

Patent Literatures

Patent Literature 1: JP 2004-37151 A

SUMMARY OF INVENTION

Technical Problem

In Patent Literature 1, in a case where the driver's visual line direction and the object of gaze are incorrect with respect to the route, speech guidance to guide the driver's visual line to a branching road to be guided is performed, by using the object that the driver is viewing as a reference. However, since the speech guidance is a normal reading speech, there is a problem that it is difficult for the driver to notice that the driver is viewing an object different from the branching road to be guided.

The present invention has been devised in order to solve the above problems, and it is an object of the present invention to provide a speech guidance device which informs a user in an easily recognizable manner that the user's visual recognition object is different from a guidance object when the user's visual recognition object is different from the guidance object.

Solution to Problem

Included are: a processor to execute a program; and a memory to store the program which, when executed by the processor, performs processes of, outputting a guidance object to which a visual line of a user is guided, detecting a visual recognition object which the user is viewing, from information indicating a direction of the visual line of the user, detecting a difference between an attribute of the visual recognition object and an attribute of the guidance object, generating a guidance sentence including the attribute of the guidance object, when there is a difference between the attribute of the guidance object included in the guidance sentence and the attribute of the visual recognition object, synthesizing and outputting speech of the guidance sentence emphasizing a word of the attribute having the difference, storing familiarity information for a plurality of words, in which familiarity indicating a degree of familiarity of the user is set to each of the plurality of words, and at a time of changing the guidance sentence depending on a value of familiarity of a word included in the guidance sentence, when the value of familiarity of the word is lower than a predetermined threshold value, moving the word to a head of the guidance sentence.

Advantageous Effects of Invention

According to the present invention, it is possible to inform a user in an easily recognizable manner that the user's visual recognition object is different from a guidance object when the user's visual recognition object is different from the guidance object.

BRIEF DESCRIPTION OF DRAWINGS

FIG. 14 is a table illustrating attribute information of an intersection A according to the first embodiment.

FIG. 15 is a table illustrating difference information according to the first embodiment.

FIG. 16 is a schematic diagram illustrating an example of a guidance sentence generated by the synthesizing unit according to the first embodiment.

FIG. 21 is a table illustrating attribute information of a switch according to the third embodiment.

FIG. 22 is a schematic diagram illustrating an example of a guidance sentence generated by a synthesizing unit according to the third embodiment.

DESCRIPTION OF EMBODIMENTS

Figures 1, 2:
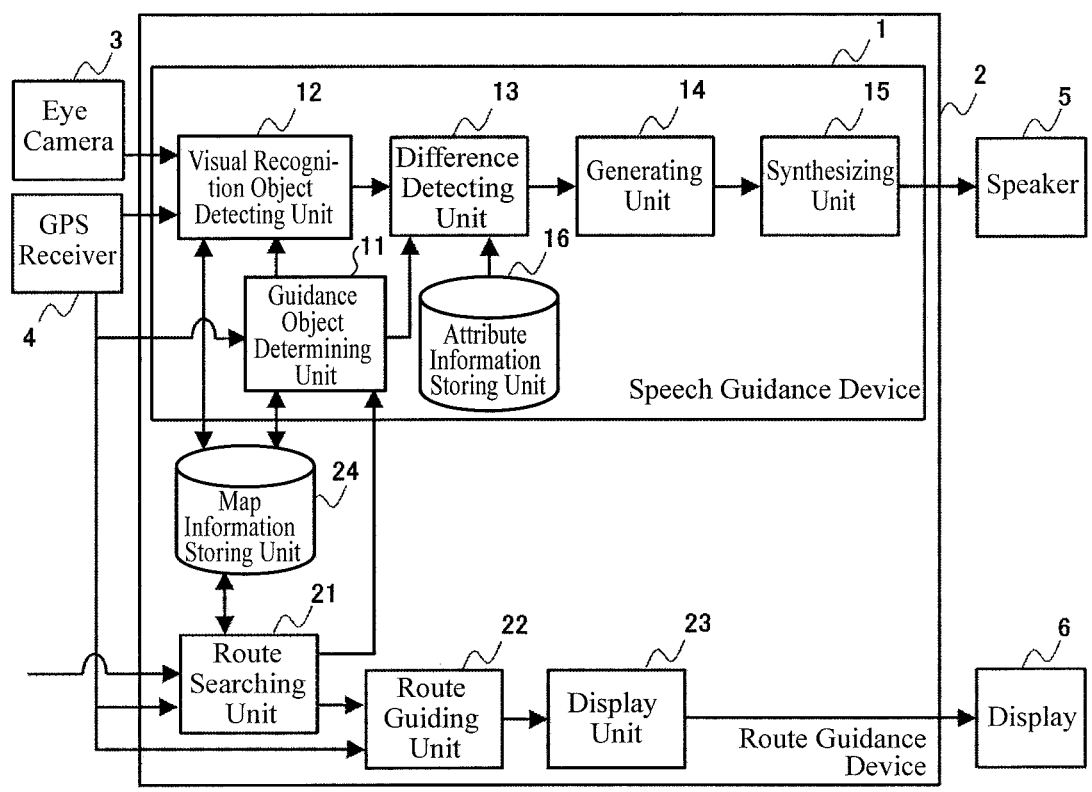
FIG. 1 is a block diagram illustrating an example of a functional configuration of a route guidance device including a speech guidance device according to a first embodiment.
FIG. 2 is a table illustrating an example of attribute information stored by an attribute information storing unit according to the first embodiment.

Embodiments of the present invention will be described below with reference to the drawings. Note that in the drawings to be referred to, the same or corresponding parts are denoted by the same symbol.

First Embodiment

In this embodiment, an explanation will be given by using an example in which a speech guidance device of the present invention is applied to a route guidance device mounted on a vehicle.

FIG. 1 is a block diagram illustrating an example of a functional configuration of a speech guidance device 1 according to the first embodiment. FIG. 1 also includes illustration of an example of a functional configuration of a route guidance device 2 including the speech guidance device 1. The speech guidance device 1 includes a guidance object determining unit 11, a visual recognition object detecting unit 12, a difference detecting unit 13, a generating unit 14, a synthesizing unit 15, and an attribute information storing unit 16. The speech guidance device 1 receives inputs from an eye camera 3 and a GPS receiver 4, and outputs synthesized speech to a speaker 5.

The route guidance device 2 includes the speech guidance device 1, a route searching unit 21, a route guiding unit 22, a display unit 23, and a map information storing unit 24. When a destination is input by a user, the route searching unit 21 acquires the current position information of the user's vehicle from the GPS receiver 4. The route searching unit 21 searches for a route from the current position to the destination by referring to map information stored in the map information storing unit 24. The route searching unit 21 outputs the route to the guidance object determining unit 11 and the route guiding unit 22. The route guiding unit 22 acquires the current position information of the user's vehicle from the GPS receiver 4 and outputs, to the display unit 23, information of the route to be guided depending on a change in the position information. The display unit 23 generates an image indicating the route to be guided and outputs the image to a display 6.

The eye camera 3 captures the movement of the eyes of the user and outputs angle information indicating a direction of a visual line of the user to the visual recognition object detecting unit 12. To detect the direction of the visual line of the user, it is sufficient to use an existing technology. For example, there are various techniques such as an electro-oculogram (EOG) method, a photoelectric element type photo-electric oculography (P-EOG) method, a corneal reflection method, a first and fourth Purkinje image detection method, a contact lens method, a search coil method, and an infrared fundus camera method.

The global positioning system (GPS) receiver 4 detects the current position of the vehicle the user is riding and outputs the detected current position information to the visual recognition object detecting unit 12 of the speech guidance device 1 and the route searching unit 21 and the route guiding unit 22 of the route guidance device 2.

The guidance object determining unit 11 of the speech guidance device 1 receives a route to a destination from the route searching unit 21. The guidance object determining unit 11 determines a guidance object to which the visual line of the user is guided. In the present embodiment, a guidance object is a landmark on a route. A guidance object is, for example, a building near an intersection which is a branch point on a route to a destination. The guidance object determining unit 11 outputs the guidance object to the difference detecting unit 13. The guidance object determining unit 11 further notifies the visual recognition object detecting unit 12 that the guidance object has been determined.

Upon being notified from the guidance object determining unit 11 that the guidance object has been determined, the visual recognition object detecting unit 12 detects a visual recognition object that the user is viewing, from information indicating the direction of the visual line of the user. The visual recognition object detecting unit 12 receives angle information indicating the visual line of the user from the eye camera 3 and the current position information of the user's vehicle from the GPS receiver 4. Using the angle information, the position information, and the map information stored in the map information storing unit 24, the visual recognition object detecting unit 12 detects the visual recognition object and outputs the visual recognition object to the difference detecting unit 13.

The difference detecting unit 13 receives the guidance object from the guidance object determining unit 11 and the visual recognition object from the visual recognition object detecting unit 12. The difference detecting unit 13 refers to attribute information stored in the attribute information storing unit 16 and acquires attribute information of the guidance object and attribute information of the visual recognition object. Attribute information is information indicating features of an object. The difference detecting unit 13 detects differences between respective attributes of the attribute information of the visual recognition object and corresponding attributes of that of the guidance object. If there is a difference, the difference detecting unit 13 outputs, to the generating unit 14, difference information indicating an attribute having the difference between the attribute information of the visual recognition object and that of the guidance object. The difference detecting unit 13 further outputs the attribute information of the guidance object to the generating unit 14.

The generating unit 14 generates a guidance sentence using the attribute information of the guidance object. The generating unit 14 stores in advance a sentence having portions to be filled in as a fixed guidance sentence. The generating unit 14 outputs the generated guidance sentence and the difference information to the synthesizing unit 15.

The synthesizing unit 15 synthesizes speech of the guidance sentence input from the generating unit 14. In addition, the synthesizing unit 15 synthesizes reading speech emphasizing a word of an attribute indicated by the difference information and outputs the synthesized speech.

In the present embodiment, the attribute information storing unit 16 stores attribute information in which intersections are associated with buildings in the vicinity thereof.

FIG. 2 is a table illustrating an example of attribute information 31 stored by the attribute information storing unit 16 according to the first embodiment. The attribute information 31 includes names of intersections, road shapes of the intersections, names of surrounding buildings in the vicinity of the intersections, and positions. A name of a surrounding building is a building located in the vicinity of an intersection and serves as a landmark of the intersection. A position is two-dimensional coordinate data. For example, attribute information of an intersection A includes a name thereof which is intersection A, a road shape thereof which is a three-way junction of a Y-letter shape, a name of a surrounding building which is fire station, and the position thereof which is longitude x1 and latitude y1.

Figure 3:
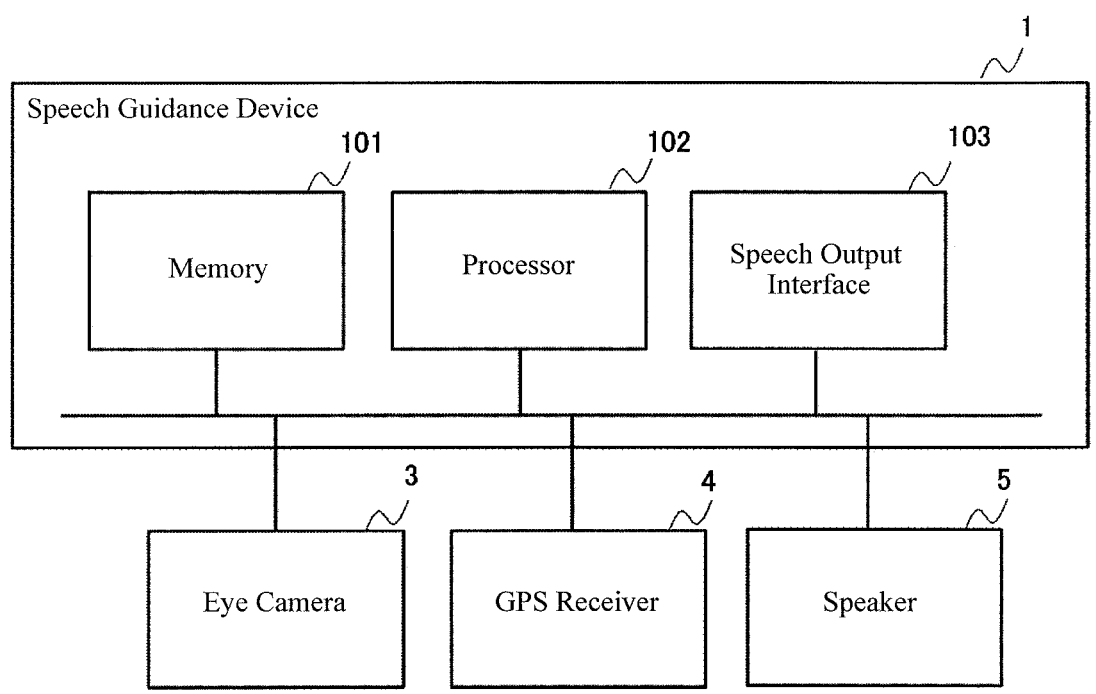
FIG. 3 is a block diagrams illustrating an example of a hardware configuration of the speech guidance device according to the first embodiment.

FIG. 3 is a block diagrams illustrating an example of a hardware configuration of the speech guidance device 1 according to the first embodiment. The speech guidance device 1 includes a memory 101, processor 102, and a speech output interface 103.

The memory 101 stores a program and data for implementing the functions of the guidance object determining unit 11, the visual recognition object detecting unit 12, the difference detecting unit 13, the generating unit 14, the synthesizing unit 15, and the attribute information storing unit 16. The memory 101 includes, for example, a read only memory (ROM), a random access memory (RAM), a hard disk drive (HDD), and a solid state drive (SSD).

The processor 102 reads the program and the data stored in the memory 101 and implements the functions of the guidance object determining unit 11, the visual recognition object detecting unit 12, the difference detecting unit 13, the generating unit 14, and the synthesizing unit 15. The processor 102 is implemented by a processing circuit such as a CPU and a system large scale integration (LSI) that executes the program stored in the memory 101.

Note that a plurality of processing circuits may be cooperate to execute the functions of the guidance object determining unit 11, the visual recognition object detecting unit 12, the difference detecting unit 13, the generating unit 14, and the synthesizing unit 15.

The speech output interface 103 implements the function of the synthesizing unit 15.

Next, operations will be described.

Figure 4:
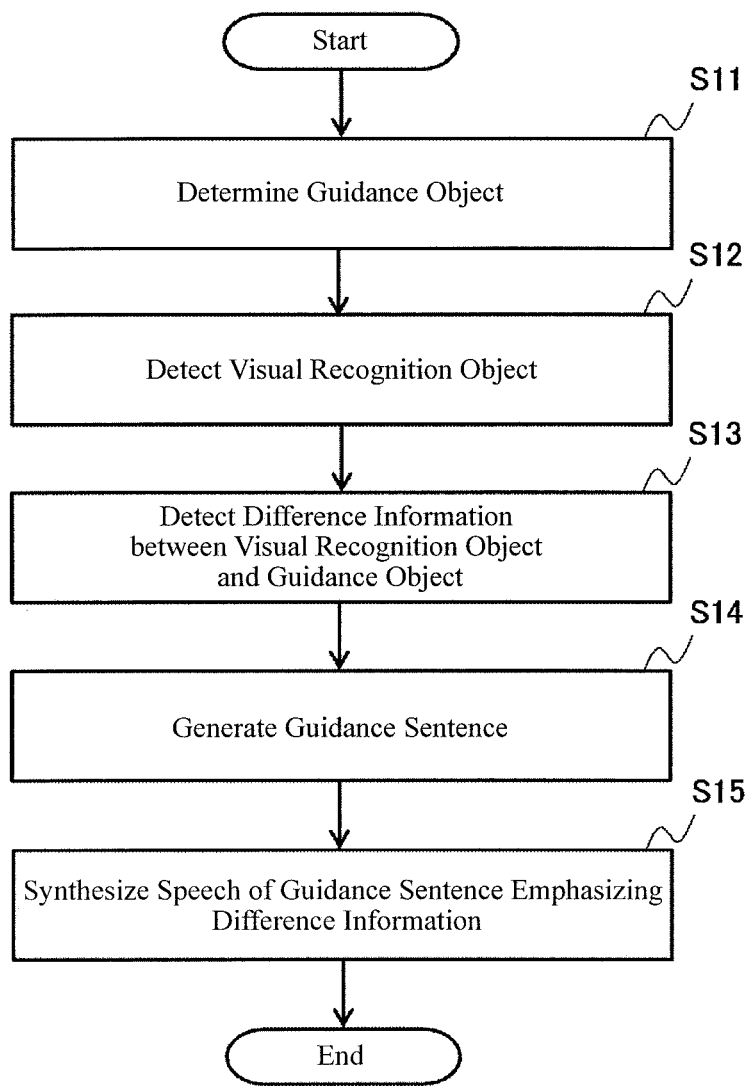
FIG. 4 is a flowchart illustrating processing of the speech guidance device according to the first embodiment.

FIG. 4 is a flowchart illustrating processing of the speech guidance device 1 according to the first embodiment.

The speech guidance device 1 starts processing when a route is input from the route guidance device 2 to the guidance object determining unit 11. The guidance object determining unit 11 determines a building in the vicinity of an intersection, which is a branch point on the route to a destination input from the route guidance device 2, as a guidance object and outputs the guidance object to the difference detecting unit 13 (step S11). Next, the visual recognition object detecting unit 12 detects the visual recognition object using angle information indicating a direction of a visual line of the user input from the eye camera 3 and outputs the visual recognition object to the difference detecting unit 13 (step S12).

Next, the difference detecting unit 13 refers to the attribute information storing unit 16 and searches for attribute information of the visual recognition object and that of the guidance object. The difference detecting unit 13 outputs the attribute information of the guidance object to the generating unit 14. The difference detecting unit 13 further detects a difference between the attribute information of the visual recognition object and that of the guidance object. If there is a difference, difference information is output to the generating unit 14 (step S13). Next, the generating unit 14 generates a guidance sentence using the attribute information of the guidance object and outputs the guidance sentence to the synthesizing unit 15. When the difference information is input from the difference detecting unit 13, the generating unit 14 outputs also the difference information to the synthesizing unit 15 (step S14). Next, the synthesizing unit 15 synthesizes speech of the guidance sentence input from the generating unit 14. In addition, the synthesizing unit 15 synthesizes reading speech emphasizing a word having a difference between the attribute of the visual recognition object and that of the guidance object from the attribute information and outputs the synthesized speech. The speech guidance device 1 ends the processing (step S15).

Next, details of each of steps S11 to S15 in FIG. 4 will be described.

First, details of step S11 in FIG. 4 will be described with reference to FIG. 5.

Figure 5:
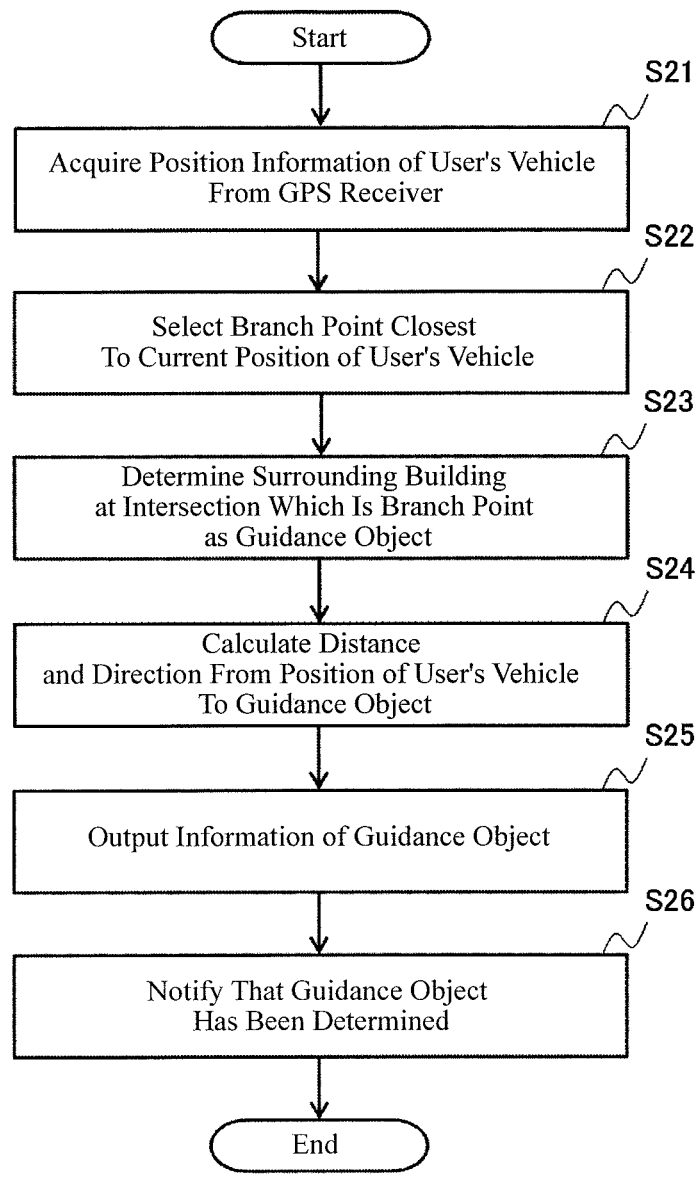
FIG. 5 is a flowchart illustrating processing of a guidance object determining unit according to the first embodiment.

FIG. 5 is a flowchart illustrating processing of the guidance object determining unit 11 according to the first embodiment.

The guidance object determining unit 11 starts processing when a route searched by the route searching unit 21 is input from the route searching unit 21. The guidance object determining unit 11 acquires the current position information and a traveling direction of the user's vehicle from the GPS receiver 4 (step S21). Next, the guidance object determining unit 11 selects an intersection which is a branch point closest to the current position of the user's vehicle from the route and acquires position information of the intersection (step S22).

Next, the guidance object determining unit 11 refers to the map information of the map information storing unit 24 and determines, as a guidance object, a building in the vicinity of the intersection which is the branch point (step S23). Next, the guidance object determining unit 11 calculates a distance from the current position of the user's vehicle to the guidance object and a direction indicating whether the guidance object is on either the left or right side of the road in the traveling direction (step S24). Next, the guidance object determining unit 11 outputs information of the guidance object to the difference detecting unit 13. The information of the guidance object is, for example, the name of the building, position information of the building, and a distance and a direction from the current position (step S25). Next, the guidance object determining unit 11 notifies the visual recognition object detecting unit 12 that the guidance object has been determined and ends the processing (step S26).

Next, details of step S12 in FIG. 4 will be described with reference to FIG. 6.

Figure 6:
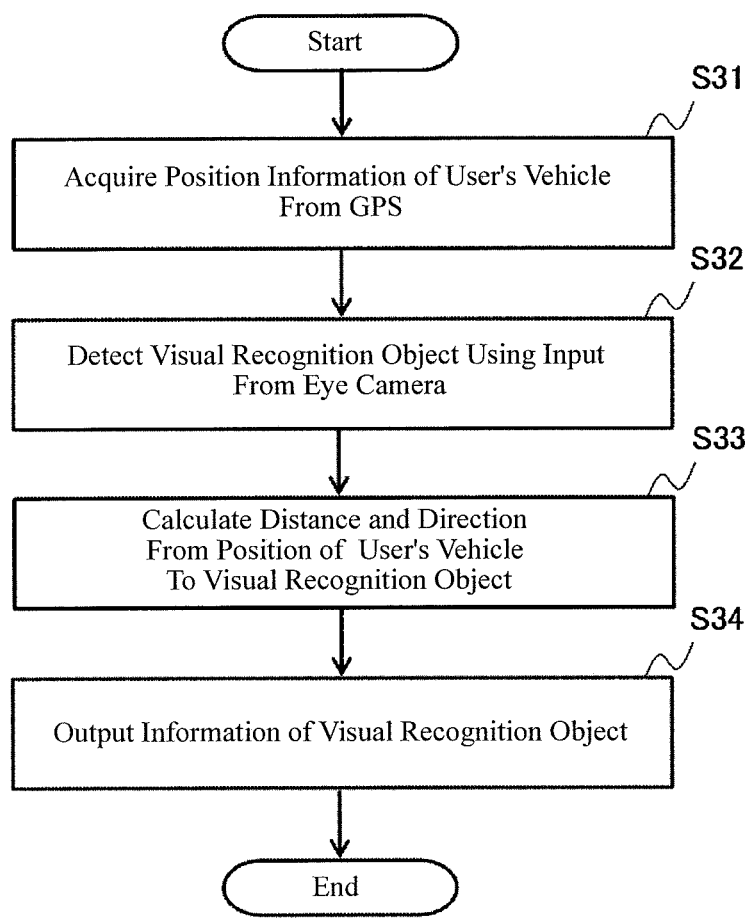
FIG. 6 is a flowchart illustrating processing of a visual recognition object detecting unit according to the first embodiment.

FIG. 6 is a flowchart illustrating processing of the visual recognition object detecting unit 12 according to the first embodiment.

The visual recognition object detecting unit 12 starts processing when notified from the guidance object determining unit 11 that the guidance object has been determined.

The visual recognition object detecting unit 12 acquires the current position information and the traveling direction of the user's vehicle from the GPS receiver 4 (step S31). The visual recognition object detecting unit 12 receives angle information indicating a direction of a visual line of the user from the eye camera 3. The visual recognition object detecting unit 12 detects a building in the direction of the visual line of the user as a visual recognition object from the position information, the angle information, and the map information of the map information storing unit 24 (step S32). Next, the visual recognition object detecting unit 12 calculates a distance from the current position of the user's vehicle to the visual recognition object and a direction indicating whether the visual recognition object is on either the left or right side of the road in the traveling direction (step S33). Next, the visual recognition object detecting unit 12 outputs information of the visual recognition object to the difference detecting unit 13 and ends the processing. The information of the visual recognition object is, for example, the name of the building, position information of the building, and a distance and a direction from the current position (step S34).

Next, details of step S13 in FIG. 4 will be described with reference to FIGS. 7 to 8.

Figures 7, 8, 9:
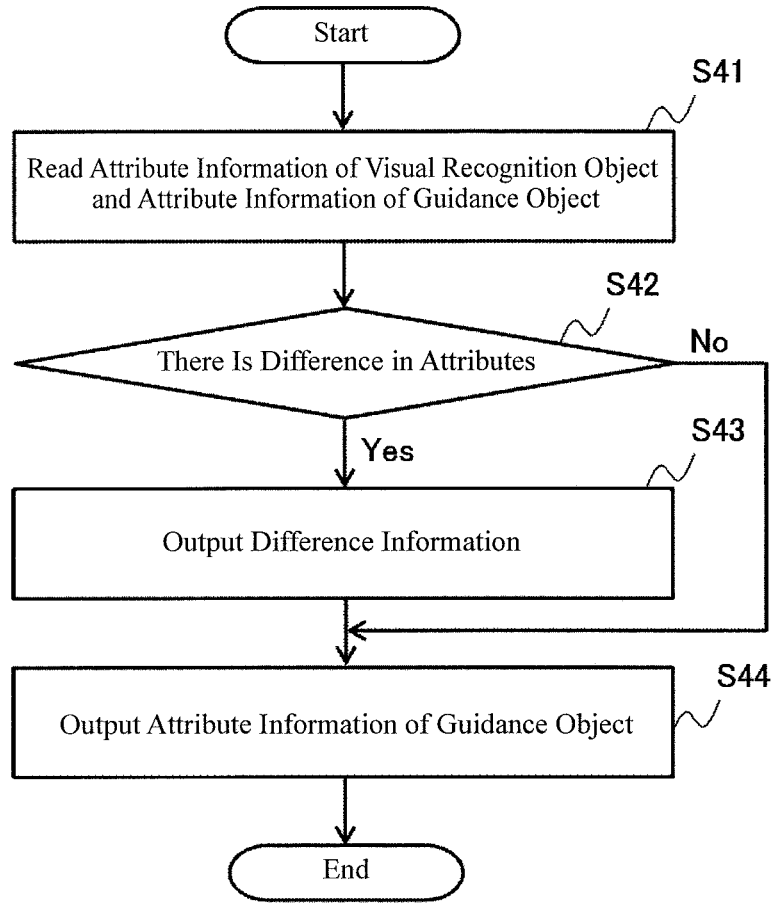
FIG. 7 is a flowchart illustrating processing of a difference detecting unit according to the first embodiment.
FIG. 8 is a table illustrating an example of attribute information of a guidance object according to the first embodiment.
FIG. 9 is a schematic diagram illustrating an example of a fixed sentence of guidance generated by a generating unit according to the first embodiment.

FIG. 7 is a flowchart illustrating processing of the difference detecting unit 13 according to the first embodiment.

The difference detecting unit 13 starts processing when receives the information of the guidance object from the guidance object determining unit 11 and the information of the visual recognition object from the visual recognition object detecting unit 12. The difference detecting unit 13 refers to the attribute information stored by the attribute information storing unit 16 and reads attributes of attribute information each of the guidance object and the visual recognition object (step S41). Next, the difference detecting unit 13 detects a difference between the attribute information of the guidance object and the attribute information of the visual recognition object. At this time, the difference detecting unit 13 detects a difference as attribute information also for the distance and the direction from the current position to the guidance object input from the guidance object determining unit 11 as well as the distance and the direction from the current position to the visual recognition object input from the visual recognition object detecting unit 12 (step S42). If there is a difference, the difference detecting unit 13 outputs difference information to the generating unit 14. The difference information indicates a value of the attribute of the guidance object which has a difference from a value of the attribute of the visual recognition object (step S43). Next, the difference detecting unit 13 outputs the attribute information of the guidance object to the generating unit 14 and ends the processing. The attribute information of the guidance object is obtained by adding the distance from the current position to the attribute information read out from the attribute information storing unit 16 (step S44).

FIG. 8 is a table illustrating an example of attribute information 32 of a guidance object according to the first embodiment. The attribute information 32 includes, as attributes, the name of an intersection, the shape of a road, the name of a surrounding building, a position, a distance, and a direction.

Next, details of step S14 in FIG. 4 will be described with reference to FIGS. 9 to 10.

FIG. 9 is a schematic diagram illustrating an example of a fixed sentence 41 of the guidance generated by the generating unit 14 according to the first embodiment. The generating unit 14 stores in advance, as a guidance sentence, the fixed sentence 41 set with portions to be filled in. The generating unit 14 sets the value of the attribute in a portion to be filled in of the fixed sentence 41. Each of [distance], [direction], [name of surrounding building], and [name of intersection] indicates an attribute of the attribute information. For example, the generating unit 14 sets a value of the distance "200 m ahead" of the attribute information of the guidance object in [distance] of the fixed sentence 41. Note that "turn right" portion of the fixed sentence 41 of the guidance is changed depending on a route to be guided.

Figure 10:
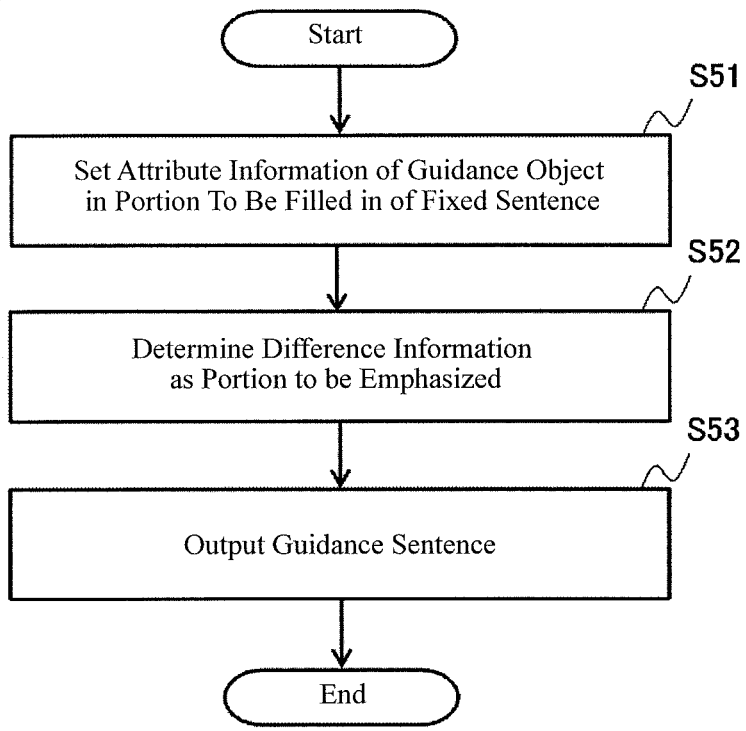
FIG. 10 is a flowchart illustrating processing of the generating unit according to the first embodiment.

FIG. 10 is a flowchart illustrating processing of the generating unit 14 according to the first embodiment.

The generating unit 14 starts the processing when receives the attribute information of the guidance object. The generating unit 14 reads the fixed sentence 41 of guidance and sets the attribute information of the guidance object in the portions to be filled in (step S51). Next, in a case where the difference information is input from the difference detecting unit 13, the generating unit 14 determines the attribute indicated by the difference information as a portion to be emphasized (step S52). The generating unit 14 outputs the generated guidance sentence and the difference information to the synthesizing unit 15 and ends the processing (step S53).

Next, details of step S15 in FIG. 4 will be described with reference to FIG. 11.

Figure 11:
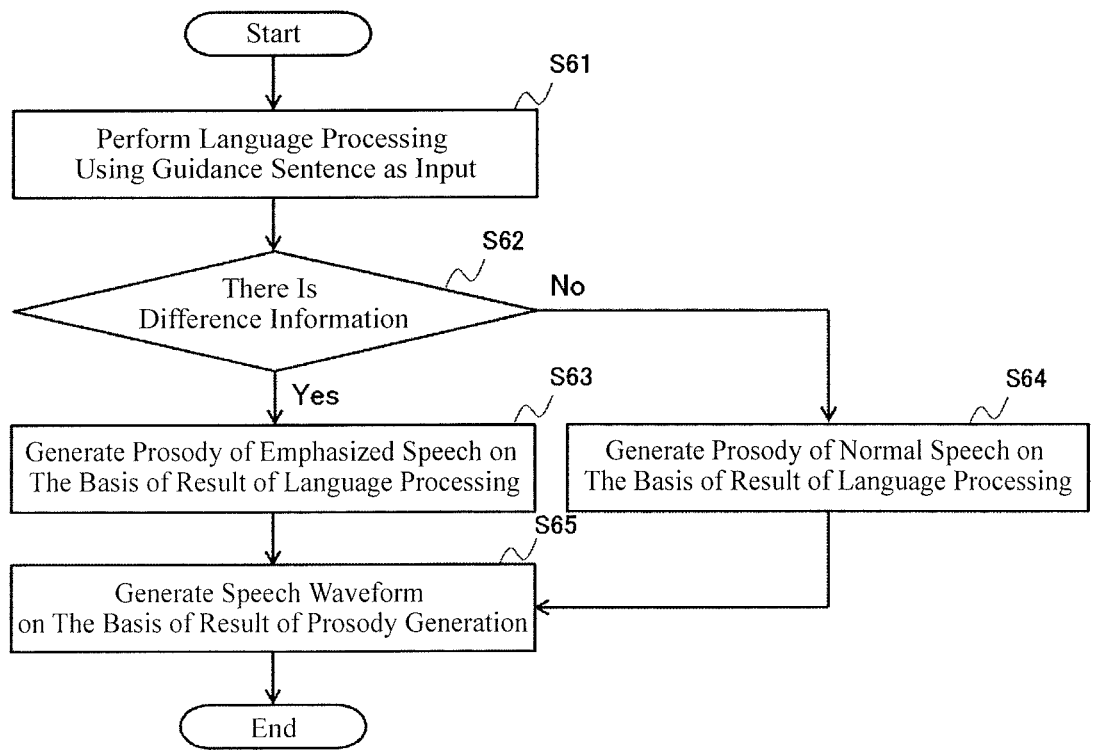
FIG. 11 is a flowchart illustrating processing of a synthesizing unit according to the first embodiment.

FIG. 11 is a flowchart illustrating processing of the synthesizing unit 15 according to the first embodiment.

The synthesizing unit 15 starts the processing when receives the guidance sentence from the generating unit 14. First, the synthesizing unit 15 performs language processing of the guidance sentence. In the language processing, processing such as morphological analysis, syntax analysis, semantic analysis, and context analysis is performed (step S61). Next, the synthesizing unit 15 determines whether difference information of attribute information has been input from the generating unit 14 (step S62). When difference information of the attribute information is input from the generating unit 14, the synthesizing unit 15 generates prosody of emphasis speech for a word indicated by the difference information while generating normal prosody for other words (step S63). When difference information of the attribute information is not input from the generating unit 14, the synthesizing unit 15 generates normal prosody (step S64). Next, the synthesizing unit 15 generates a speech waveform on the basis of the result of the prosody generation, outputs the waveform data of the synthesized speech to the speaker 5, and ends the processing (step S65).

Next, operations of the speech guidance device 1 will be described using a specific example.

Figures 12, 13:
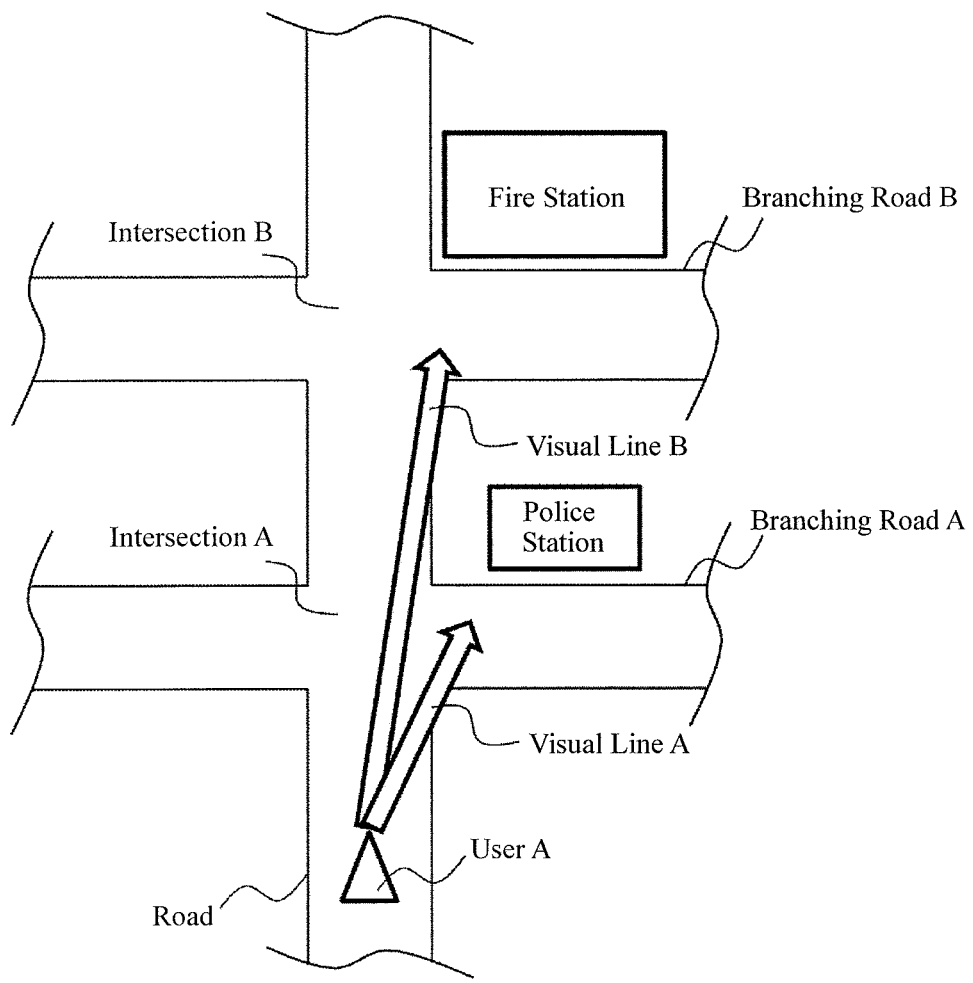
FIG. 12 is a schematic diagram illustrating an example of a map of a route to be guided by the speech guidance device according to the first embodiment.
FIG. 13 is a table illustrating attribute information of an intersection B according to the first embodiment.

FIG. 12 is a schematic diagram illustrating an example of a map of a route guided by the speech guidance device 1 according to the first embodiment. A user A is traveling in a vehicle on a road guided by the route guidance device 2 from the bottom to the top in the drawing. There are an intersection A and an intersection B in a short distance. A visual line A of the user A is directed in a direction toward "police station" at a branching road A. The route guidance device 2 sets a branching road B to turn right (road for turning right) at the intersection B as a traveling direction on a route to a destination. There is the intersection A before the intersection B and the branching road A is in the same direction as the branching road B, and thus it is difficult for the user A to recognize the branching road B.

First, the guidance object determining unit 11 determines a "fire station" as the guidance object. The guidance object determining unit 11 further calculates a distance and a direction from the current position to the guidance object and outputs distance "100 m ahead" and direction "right direction" to the difference detecting unit 13. Next, the visual recognition object detecting unit 12 detects an object viewed by the user A using the eye camera 3. The user A is viewing a "police station" as indicated by the visual line A, and the visual recognition object detecting unit 12 detects the "police station" as a visual recognition object. The difference detecting unit 13 receives the "fire station" as the guidance object from the guidance object determining unit 11 and the "police station" as the visual recognition object from the visual recognition object detecting unit 12. Next, the difference detecting unit 13 reads out attribute information of the "police station" and the "fire station" from the attribute information storing unit 16.

FIG. 13 is a table illustrating attribute information 33 of the "fire station" according to the first embodiment.

FIG. 14 is a table illustrating attribute information 34 of the "police station" according to the first embodiment.

In each of the attribute information 33 and 34, the distance and the direction are added to the attributes read out from the attribute information storing unit 16.

FIG. 15 is a schematic diagram illustrating difference information 39 according to the first embodiment.

The difference detecting unit 13 compares the attribute information 33 of the "fire station" which is the guidance object with the attribute information 34 of the "police station" which is the visual recognition object and detects differences therebetween. The differences are the name of intersection, the name of surrounding building, the position, and the distance.

The difference detecting unit 13 outputs the difference information 39 to the generating unit 14. The difference detecting unit 13 outputs also the attribute information 33 of the guidance object to the generating unit 14.

The generating unit 14 sets the attributes of the attribute information 34 of the guidance object in the portions to be filled in of the fixed sentence 41 of guidance illustrated in FIG. 9. The generating unit 14 outputs the filled guidance sentence and the difference information 39 to the synthesizing unit 15. The synthesizing unit 15 generates synthesized speech emphasizing the name of intersection "intersection B", the name of surrounding building "fire station" and the distance "100 m ahead" indicated by the difference information 39. Since the direction is not included in the difference information 39, the synthesizing unit 15 synthesizes speech to be read as usual without emphasizing the direction "right direction". The synthesizing unit 15 outputs the synthesized speech to the speaker.

FIG. 16 is a schematic diagram illustrating an example of a guidance sentence 42 generated by the synthesizing unit 15 according to the first embodiment. A word enclosed by [ ] or < > indicates a portion to be filled in of the fixed sentence 41 of the guidance. The synthesizing unit 15 generates speech to be read with an emphasis on a word enclosed by < >.

The user having heard the guidance sentence moves his or her visual line from a visual line A toward a visual line B in FIG. 12, and thus can recognize the "fire station".

Note that in the present embodiment the guidance object determining unit 11 calculates the distance from the current position to the guidance object; however, the attribute information storing unit 16 may store in advance the distance from a building to an intersection as attribute information of the intersection, and the guidance object determining unit 11 may not calculate the distance from the current position to the guidance object. The guidance sentence may be "intersection xx m ahead of a building".

In addition, in the present embodiment the guidance object determining unit 11 determines, as the guidance object, a building in the vicinity of an intersection which is a branch point of a route from the route input thereto; however, an object input to the guidance object determining unit 11 may be determined as the guidance object.

Furthermore, in the present embodiment the operation of the speech guidance device 1 when a route is input from the route searching unit 21 to the guidance object determining unit 11 has been described. However, when the user's vehicle has passed the branch point as the user's vehicle travels along the route, it is only required that the guidance object determining unit 11 determines a guidance object for the next branch point and that the speech guidance device 1 performs speech guidance.

Furthermore, in the present embodiment the visual recognition object detecting unit 12 detects the visual recognition object using the angle information indicating the visual line of the user, the current position information of the user's vehicle, and the map information; however, the visual recognition object may be detected by capturing an outside view from the vehicle and using the captured image, the angle information indicating the visual line of the user, and the map information.

Furthermore, in the present embodiment the case where one intersection and one surrounding building are associated with each other in the attribute information is used; however, a plurality of surrounding buildings may be associated with one intersection.

Furthermore, in the present embodiment a name of an intersection is used to fill in the guidance sentence; however, the shape of a road or another attribute may be used. Alternatively, a plurality of attributes may be used.

Furthermore, in the present embodiment the synthesizing unit 15 outputs the synthesized speech to the speaker 5; however, the synthesized speech data may be converted into an analog signal and then output the analog signal to the speaker 5. In addition, a generated synthesized speech waveform data may be output to and written in the memory as a file or stream data.

Furthermore, in the present embodiment it has been described that the synthesizing unit 15 synthesizes speech from the guidance sentence; however, the synthesizing unit 15 may include a plurality of functional units. In a case where speech is synthesized from a text, for example as described in Japanese Patent No. 5393546, the synthesizing unit may include a language processing unit, a prosody generating unit, and a speech waveform generating unit.

As described above, included in the present embodiment are: the guidance object determining unit 11 for outputting a guidance object to which a visual line of the user is guided; the visual recognition object detecting unit 12 for detecting a visual recognition object which the user is viewing, from information indicating a direction of the visual line of the user; the difference detecting unit 13 for detecting a difference between an attribute of the visual recognition object and an attribute of the guidance object; the generating unit 14 for generating a guidance sentence including the attribute of the guidance object; and the synthesizing unit 15 for, when there is a difference between the attribute of the guidance object included in the guidance sentence and the attribute of the visual recognition object, synthesizing and outputting speech of the guidance sentence emphasizing a word of an attribute having the difference. Therefore, it is possible to inform the user in an easily recognizable manner that the user's visual recognition object is different from the guidance object when the user's visual recognition object is different from the guidance object. The user can intuitively notice that the visual recognition object is different from the guidance object from the difference in the prosody of the guidance sentence. This enables reducing cases where the user keeps recognizing an erroneous guidance object.

Second Embodiment

In the first embodiment described above, the speech guidance device 1 outputs a guidance sentence which is read while emphasizing a difference between an attribute of the visual recognition object and that of the guidance object. In the present embodiment, however, an embodiment in which a structure of a guidance sentence is changed on the basis of familiarity of a word included in an attribute is described.

Note that in the present embodiment parts other than a generating unit 14 and a familiarity information storing unit 17 are the same as those in the first embodiment, and thus descriptions thereof will be omitted.

Figure 17:
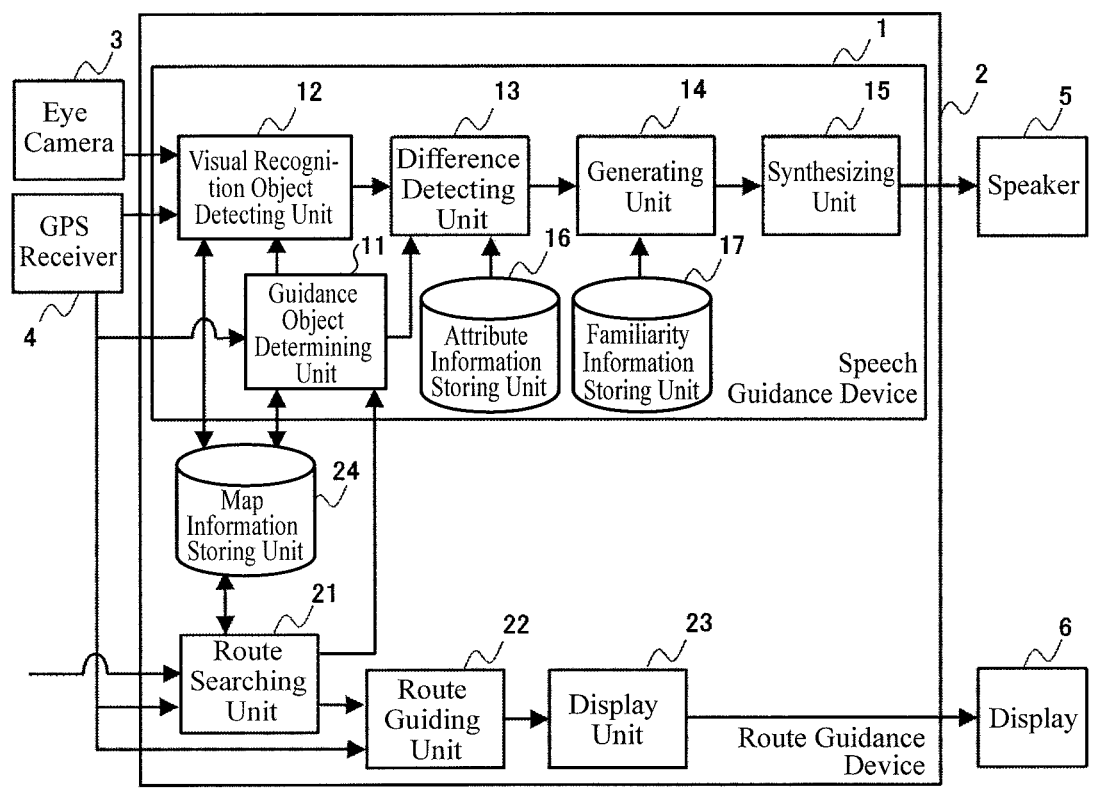
FIG. 17 is a block diagram illustrating an example of a functional configuration of a route guidance device including a speech guidance device according to a second embodiment.

FIG. 17 is a block diagram illustrating an example of a functional configuration of a route guidance device 2 including a speech guidance device 1 according to a second embodiment. A difference from FIG. 1 of the first embodiment is that the familiarity information storing unit 17 is added. The familiarity information storing unit 17 stores, in advance, familiarity information indicating familiarity of a word. Familiarity is an index indicating how much a person feels familiar to a certain word in the field of language processing. A higher value indicates that the person feels more familiar. The familiarity information stored by the familiarity information storing unit 17 is preset information. A program and data for implementing the function of the familiarity information storing unit 17 are stored in the memory 101.

A generating unit 14 reads out a fixed sentence of guidance, sets the attribute information of a guidance object in portions to be filled in, and generates a guidance sentence "<100 m ahead>, turn right at <intersection B> with a <fire station>." At this time, the generating unit 14 refers to the familiarity information storing unit 17 and reads out familiarity of each of the words. It is assumed that familiarity of "fire station" is lower than a predetermined threshold value. The generating unit 14 moves "with a fire station" to the head of the guidance sentence and outputs "<With a fire station", turn right at [intersection B] [100 m ahead]." Words enclosed by [ ] or < > are portions to be filled in of the fixed sentence 41 of guidance. The word enclosed by < > is output from the synthesizing unit 15 while being in emphasized speech.

Alternatively, the generating unit 14 may exclude a word having low familiarity from the guidance sentence as being an unfamiliar word. The generating unit 14 erases "with a fire station" from the guidance sentence and outputs "Turn [in right direction] at [intersection B] [100 m ahead]." as a guidance sentence. In general, words with low familiarity are often unfamiliar to the user's ears and thus are difficult to be understood even when the words are read. By excluding words with low familiarity from the guidance sentence, it becomes easier for the user to understand the guidance sentence and to find the guidance object.

When setting familiarity in advance, for example, familiarity of a word indicating a color such as red and yellow may be set to a high value (100), and familiarity of a proper noun such as a name of a building may be set to a low value (0).

As described above, in the present embodiment, the familiarity information storing unit 17 for storing familiarity information for a plurality words, in which familiarity indicating a degree of familiarity of the user is set to each of the plurality of words is included, and the generating unit changes a guidance sentence depending on a value of familiarity of a word included in the guidance sentence. Therefore, it is possible to inform a user in a more easily recognizable manner that the user's visual recognition object is different from a guidance object. The user can find the guidance object more easily.

In a case where the value of the familiarity of a word included in the guidance sentence is lower than the predetermined threshold value, the generating unit moves the word to the head of the guidance sentence, and thus the generating unit can present the difference in attributes to the user at an earlier timing. Therefore, the user can promptly move the visual line to the guidance object.

Also, in a case where the value of the familiarity of the word included in the guidance sentence is lower than the predetermined threshold value, the generating unit erases the word from the guidance sentence, so that obscure information is not presented, which is not inconvenient for the user. Therefore, it becomes easier for the user to understand the guidance sentence.

Third Embodiment

In the first embodiment described above, the speech guidance device 1 is applied to the route guidance device 2 mounted on a vehicle; however, the present embodiment illustrates that a speech guidance device 1 is applied to inspection work of a switchboard.

Note that in the present embodiment, parts other than a guidance object determining unit 11, a visual recognition object detecting unit 12, and an operation information storing unit 25 are the same as those in the first embodiment, and thus descriptions thereof will be omitted.

Description is provided with an example of inspection work of a switchboard.

Figure 18:
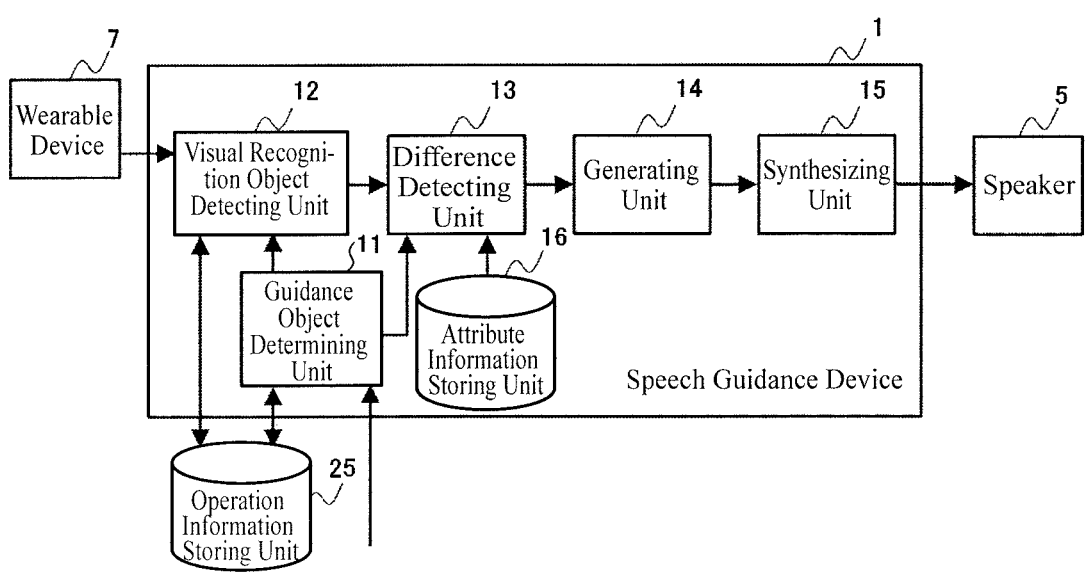
FIG. 18 is a block diagram illustrating an example of a functional configuration of a speech guidance device according to a third embodiment.

FIG. 18 is a block diagram illustrating an example of a functional configuration of a speech guidance device 1 according to a third embodiment. Differences from the speech guidance device 1 of the first embodiment is that angle information indicating the visual line of the user is input from a glass-type wearable device 7 to the visual recognition object detecting unit 12 and that the guidance object determining unit 11 and the visual recognition object detecting unit 12 refer to operation information stored by the operation information storing unit 25.

The operation information storing unit 25 stores arrangement information of switches arranged on the board face of the switchboard and an operation procedure in inspection work. The operation procedure is that of the switches in the inspection work.

Figures 19, 20:
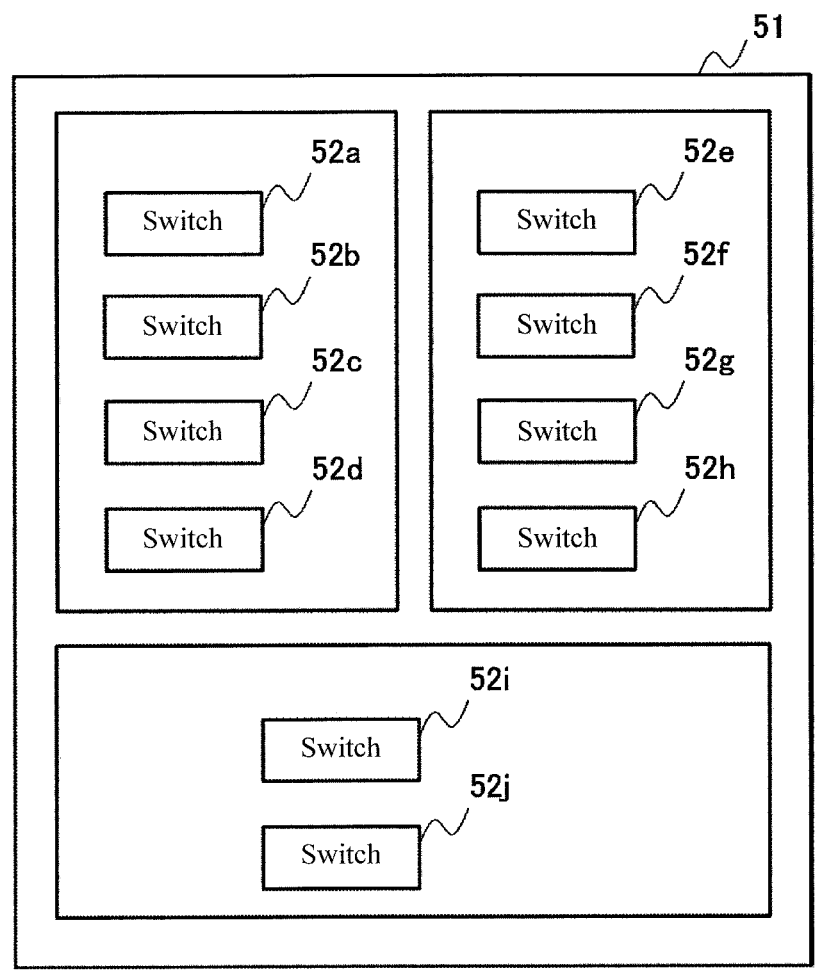
FIG. 19 is a schematic diagram illustrating an example of a board surface of a switchboard according to the third embodiment.
FIG. 20 is a table illustrating attribute information of a switch according to the third embodiment.

FIG. 19 is a schematic diagram illustrating an example of a board surface of a switchboard 51 according to the third embodiment. Switches 52a to 52d are arranged on an upper left side of the board surface of the switchboard 51. Switches 52e to 52h are arranged on an upper right side of the board surface of the switchboard 51. Switches 52i to 52j are arranged on a lower side of the board surface of the switchboard 51.

The operation of the speech guidance device 1 will be described with reference to the flowchart of FIG. 4.

When the user inputs that inspection work X is performed, the guidance object determining unit 11 starts the processing. The guidance object determining unit 11 refers to the operation information storing unit 25 and reads out an operation procedure corresponding to the inspection work X. In a case where a switch corresponding to the first procedure is the switch 52*i*, the guidance object determining unit 11 determines the switch 52*i* as a guidance object. The guidance object determining unit 11 notifies the visual recognition object detecting unit 12 that the guidance object has been determined (step S11). Next, the visual recognition object detecting unit 12 detects a visual recognition object of the user from the angle information indicating the visual line of the user input from the wearable device 7 and the arrangement information of the switches stored by the operation information storing unit 25. It is assumed that the detected visual recognition object is the switch 52*b* (step S12). Next, the difference detecting unit 13 refers to the attribute information stored by the attribute information storing unit 16 and detects a difference between attribute information of the visual recognition object and that of the guidance object (step S13).

FIG. 20 is a table illustrating attribute information 35 of the switch 52*b* according to the third embodiment.

FIG. 21 is a table illustrating attribute information 36 of the switch 52*i* according to the third embodiment.

FIG. 22 is a schematic diagram illustrating an example of a guidance sentence 43 generated by a synthesizing unit 15 according to the third embodiment.

If there is a difference between the attribute information of the visual recognition object and that of the guidance object, the difference information is output to the generating unit 14. Attributes of the name of switch and the position are different (step S14). Next, the generating unit 14 generates the guidance sentence 43 using the attribute information of the guidance object and outputs the guidance sentence 43 to the synthesizing unit 15. Next, the synthesizing unit 15 synthesizes speech of the guidance sentence 43 input from the generating unit 14. In a case where the difference information is input, the synthesizing unit 15 synthesizes reading speech emphasizing a word of an attribute indicated by the difference information and outputs the synthesized speech. The speech guidance device 1 ends the processing (step S16).

Note that in the present embodiment, an example in which the speech guidance device 1 is applied to inspection work of the switchboard has been described; however, it is also possible to apply the speech guidance device 1 to operation of a remote controller of a home appliance. It is only required that the operation information storing unit 25 stores an operation procedure of the home appliance and the information of the positions of buttons arranged on a surface of the remote controller.

REFERENCE SIGNS LIST

1: Speech guidance device, 2: Route guidance device, 3: Eye camera, 4: GPS receiver, 5: Speaker, 6: Display, 7: Wearable device, 11: Guidance object determining unit, 12: Visual recognition object detecting unit, 13: Difference detecting unit, 14: Generating unit, 15: Synthesizing unit, 16: Attribute information storing unit, 17: Familiarity information storing unit, 21: Route searching unit, 22: Route guiding unit, 23: Display unit, 24: Map information storing unit, 25: Operation information storing unit, 31, 32, 33, 34, 35, 36: Attribute information, 39: Difference information, 41: Fixed guidance sentence, 42, 43: Guidance sentence, 51: Switchboard, 52*a* to 52*j*: Switch, 101: Memory, 102: Processor, 103: Speech output interface

The invention claimed is:

1. A speech guidance device, comprising:
a processor to execute a program; and
a memory to store the program which, when executed by the processor, performs processes of,
outputting a guidance object to which a visual line of a user is guided,
detecting a visual recognition object which the user is viewing, from information indicating a direction of the visual line of the user,
detecting a difference between an attribute of the visual recognition object and an attribute of the guidance object,
generating a guidance sentence including the attribute of the guidance object,
when there is a difference between the attribute of the guidance object included in the guidance sentence and the attribute of the visual recognition object, synthesizing and outputting speech of the guidance sentence emphasizing a word of the attribute having the difference,
storing familiarity information for a plurality of words, in which familiarity indicating a degree of familiarity of the user is set to each of the plurality of words, and
at a time of changing the guidance sentence depending on a value of familiarity of a word included in the guidance sentence, when the value of familiarity of the word is lower than a predetermined threshold value, moving the word to a head of the guidance sentence.

2. The speech guidance device according to claim 1, wherein the processes include storing the familiarity information in which a high value is set to a word indicating a color.

3. The speech guidance device according to claim 2, wherein the processes include storing the familiarity information in which a low value is set to a word indicating a proper noun.

4. The speech guidance device according to claim 1, wherein the processes include storing the familiarity information in which a low value is set to a word indicating a proper noun.

5. A speech guidance device, comprising:
a guidance object determiner to output a guidance object to which a visual line of a user is guided;
a visual recognition object detector to detect a visual recognition object which the user is viewing, from information indicating a direction of the visual line of the user;
a difference detector to detect a difference between an attribute of the visual recognition object and an attribute of the guidance object;
a generator to generate a guidance sentence including the attribute of the guidance object;
a synthesizer to, when there is a difference between the attribute of the guidance object included in the guidance sentence and the attribute of the visual recognition object, synthesize and output speech of the guidance sentence emphasizing a word of the attribute having the difference; and
a familiarity information storage to store familiarity information for a plurality of words, in which familiarity indicating a degree of familiarity of the user is set to each of the plurality of words,
wherein the generator changes the guidance sentence depending on a value of familiarity of a word included in the guidance sentence, and when the value of familiarity of the word is lower than a predetermined threshold value, moves the word to a head of the guidance sentence.

6. A speech guidance method, comprising:

outputting a guidance object to which a visual line of a user is guided;

detecting a visual recognition object which the user is viewing, from information indicating a direction of the visual line of the user;

detecting a difference between an attribute of the visual recognition object and an attribute of the guidance object;

generating a guidance sentence including the attribute of the guidance object; and when there is a difference between the attribute of the guidance object included in the guidance sentence and the attribute of the visual recognition object, synthesizing and outputting speech of the guidance sentence emphasizing a word of the attribute having the difference;

storing familiarity information for a plurality of words, in which familiarity indicating a degree of familiarity of the user is set to each of the plurality of words; and at a time of changing the guidance sentence depending on a value of familiarity of a word included in the guidance sentence, when the value of familiarity of the word is lower than a predetermined threshold value, moving the word to a head of the guidance sentence.

* * * * *